US012706464B2

(12) United States Patent
Xu et al.

(10) Patent No.: US 12,706,464 B2
(45) Date of Patent: Aug. 11, 2026

(54) MULTI-CONVERTER PARALLEL CONNECTION SYSTEM AND OFF-GRID STARTUP METHOD

(71) Applicant: SungrowPower Supply (Jiangsu) Co., Ltd., Nanjing (CN)

(72) Inventors: Ye Xu, Nanjing (CN); Haitao Li, Nanjing (CN); Lin Cheng, Nanjing (CN); Jinhu Cao, Nanjing (CN)

(73) Assignee: SungrowPower Supply (Jiangsu) Co., Ltd., Nanjing (CN)

( * ) Notice: Subject to any disclaimer, the term of this patent is extended or adjusted under 35 U.S.C. 154(b) by 0 days.

(21) Appl. No.: 19/098,127

(22) Filed: Apr. 2, 2025

(65) Prior Publication Data

US 2025/0337249 A1 Oct. 30, 2025

(30) Foreign Application Priority Data

Apr. 24, 2024 (CN) ........................ 202410501948.9

(51) Int. Cl.

| | |
|---|---|
| ***H02J 3/388*** | (2026.01) |
| ***H02J 3/001*** | (2026.01) |
| ***H02M 1/00*** | (2007.01) |
| ***H02M 7/493*** | (2007.01) |

(52) U.S. Cl.

CPC .............. *H02J 3/388* (2020.01); *H02J 3/001* (2020.01); *H02M 1/0087* (2021.05); *H02M 7/493* (2013.01)

(58) Field of Classification Search

CPC .......... H02J 3/001; H02J 3/0014; H02J 3/388; H02J 3/46; H02J 13/00; H02M 1/0087; H02M 7/493

USPC .......................................................... 307/82

See application file for complete search history.

(56) References Cited

U.S. PATENT DOCUMENTS

| | | | | |
|---|---|---|---|---|
| 9,712,081 | B2 * | 7/2017 | Tanaka | H02J 3/46 |
| 2015/0016160 | A1 | 1/2015 | Tanaka et al. | |

FOREIGN PATENT DOCUMENTS

| | | | |
|---|---|---|---|
| CN | 202309099 | U | 7/2012 |
| WO | WO 2004/068687 | A1 | 8/2004 |

OTHER PUBLICATIONS

Extended European Search Report dated Oct. 9, 2025 for European Application No. 25166644.2.

* cited by examiner

*Primary Examiner* — Hal Kaplan

(74) *Attorney, Agent, or Firm* — Wolf, Greenfield & Sacks, P.C.

(57) ABSTRACT

A voltage regulation method for a multi-converter parallel connection system is provided. The multi-converter parallel connection system includes N converters. Alternating-current sides of the N converters are connected to an alternating-current bus. N is an integer greater than or equal to 2. M converters among the N converters are switched from a current-source operation mode to a voltage-source operation mode to form an alternating-current bus voltage, when the N converters are disconnected from a power grid or the power grid fails. M is an integer less than or equal to N. Remaining N-M converters among the N converters are switched from the current-source operation mode to the voltage-source operation mode after the alternating-current bus voltage is formed.

14 Claims, 2 Drawing Sheets

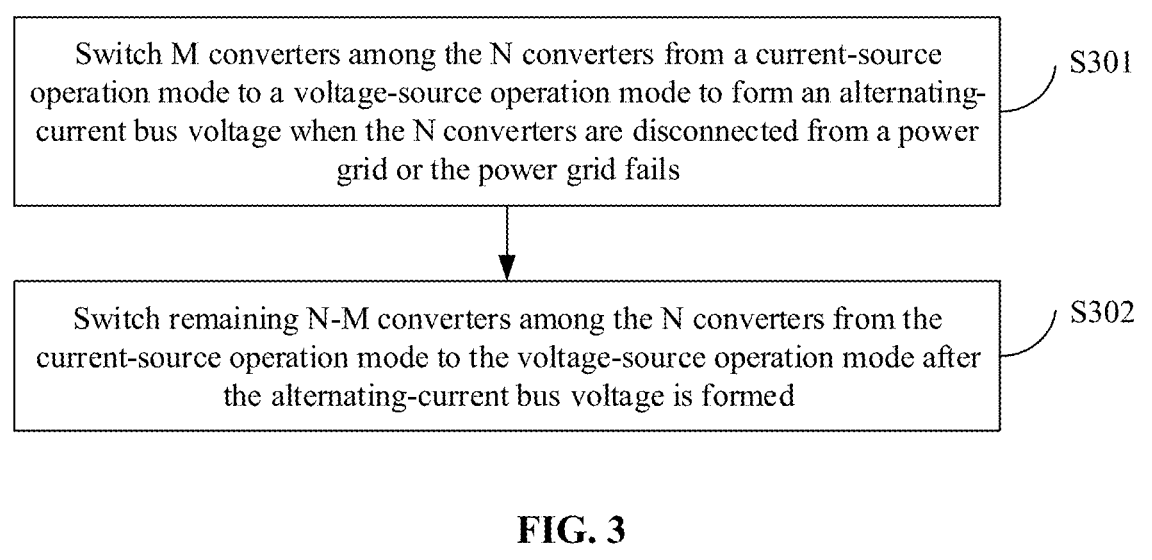

Switch M converters among the N converters from a current-source operation mode to a voltage-source operation mode to form an alternating-current bus voltage when the N converters are disconnected from a power grid or the power grid fails — S301

Switch remaining N-M converters among the N converters from the current-source operation mode to the voltage-source operation mode after the alternating-current bus voltage is formed — S302

FIG. 3

MULTI-CONVERTER PARALLEL CONNECTION SYSTEM AND OFF-GRID STARTUP METHOD

The present application claims the priority to Chinese Patent Application No. 202410501948.9, titled "MULTI-CONVERTER PARALLEL CONNECTION SYSTEM AND OFF-GRID STARTUP METHOD", filed on Apr. 24, 2024 with the Chinese Patent Office, which is incorporated herein by reference in its entirety.

FIELD

The present disclosure relates to the technical field of power electronics, and in particular to a multi-converter parallel connection system and an off-grid startup method.

BACKGROUND

At present, to improve load capacity of an energy storage system, the energy storage system includes multiple converters. The multiple converters are connected together on alternating-current sides for grid-connected power generation, forming a multi-converter parallel connection system. When the power grid fails, the multi-converter parallel connection system operates in an off-grid operation state to supply power to loads.

A monitoring unit is configured to remotely monitor states of all the converters in the multi-converter parallel connection system and perform unified control. The monitoring unit is generally powered by the power grid. When the power grid fails, the monitoring unit cannot operate normally, that is, the monitoring unit cannot remotely monitor the converters in the multi-converter parallel connection system and cannot transmit instructions to the converters to switch from a current-source operation mode to a voltage-source operation mode. To ensure that the monitoring unit is continuously powered and operates when the power grid fails, an auxiliary power supply is arranged for the monitoring unit according to the relational technology. However, the costs of the multi-converter parallel connection system are to be increased with the auxiliary power supply.

SUMMARY

In view of this, a multi-converter parallel connection system and an off-grid startup method are provided according to the present disclosure, to switch the converters in the multi-converter parallel connection system, operating in the off-grid operation state, from a current-source operation mode to a voltage-source operation mode without an auxiliary power supply.

According to an embodiment of the present disclosure, a multi-converter parallel connection system is provided. The multi-converter parallel connection system includes N converters. Alternating-current sides of the N converters are connected to an alternating-current bus. N is an integer greater than or equal to 2. M converters among the N converters are configured, when the N converters are disconnected from a power grid or the power grid fails, to switch from a current-source operation mode to a voltage-source operation mode to form an alternating-current bus voltage. M is an integer less than or equal to N. Remaining N-M converters among the N converters are configured, after the alternating-current bus voltage is formed, to switch from the current-source operation mode to the voltage-source operation mode.

According to an embodiment of the present disclosure, a voltage regulation method for a multi-converter parallel connection system is further provided. The multi-converter parallel connection system includes N converters. Alternating-current sides of the N converters are connected to an alternating-current bus. N is an integer greater than or equal to 2. The method includes: switching M converters among the N converters from a current-source operation mode to a voltage-source operation mode to form an alternating-current bus voltage when the N converters are disconnected from a power grid or the power grid fails, where M is an integer less than or equal to N; and switching remaining N-M converters among the N converters from the current-source operation mode to the voltage-source operation mode after the alternating-current bus voltage is formed.

BRIEF DESCRIPTION OF THE DRAWINGS

FIG. 3 is a flowchart of a voltage regulation method for a multi-converter parallel connection system according to an embodiment of the present disclosure.

DETAILED DESCRIPTION

In order to enable those skilled in the art to better understand and implement the technical solutions according to the embodiments of the present disclosure, application scenarios are described below in conjunction with the accompanying drawings.

Figure 1:
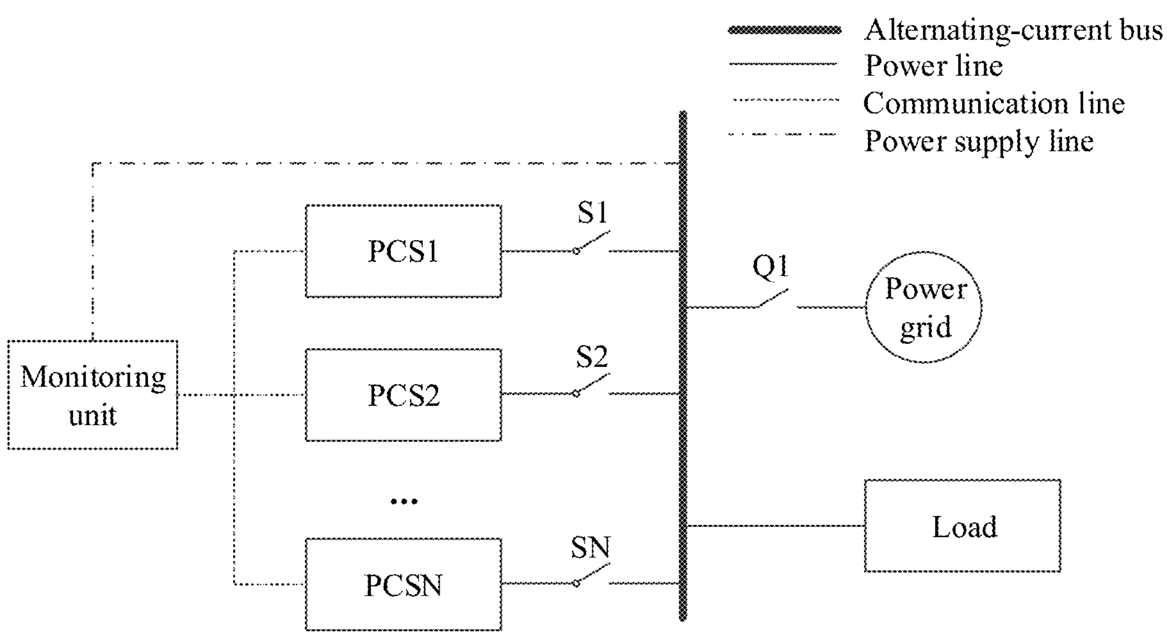
FIG. 1 is a schematic diagram of a multi-converter parallel connection system according to an embodiment of the present disclosure.

Referring to FIG. 1, FIG. 1 is a schematic diagram of a multi-converter parallel connection system according to an embodiment of the present disclosure.

The multi-converter parallel connection system according to the embodiment of the present disclosure includes N converters. Following descriptions are provided by taking the N converters as N power conversion systems (PCSs) as an example. As shown in FIG. 1, PCS1 is connected to a common connection point through a switch S1, PCS2 is connected to the common connection point through a switch S2, PCSN is connected to the common connection point through a switch SN, and a load is connected to the common connection point.

To increase flexibility of power supply, a photovoltaic power generation system capable of operating both in an on-grid operation state and in an off-grid operation state receives widespread attention.

Application scenarios of the multi-converter parallel connection system are not limited in this application. For example, the multi-converter parallel connection system may be applied to a photovoltaic power generation system, and direct-current sides of converters may be connected to photovoltaic arrays and/or batteries.

To increase flexibility of power supply, the multi-converter parallel connection system may operate both in an on-grid operation state and in an off-grid operation state. Further, the converter may operate both in a current-source operation mode and in a voltage-source operation mode, and may switch between the current-source operation mode and the voltage-source operation mode.

In a case that the power grid fails or the grid-connection switch Q1 is turned off, the multi-converter parallel connection system starts to supply power to the load. In this case, the multi-converter parallel connection system operates in the off-grid operation state.

As shown in FIG. 1, a monitoring unit is configured to monitor states of all the converters in the multi-converter parallel connection system and perform unified control. The monitoring unit is generally powered by the power grid. In the case that the power grid fails, the monitoring unit cannot operate normally. The monitoring unit cannot remotely monitor the converters in the multi-converter parallel connection system, and cannot transmit instructions to the converters in the multi-converter parallel connection system to switch from a current-source operation mode to a voltage-source operation mode.

Therefore, in the case that the power grid cannot supply power to the monitoring unit, how to perform off-grid startup on the converters in the multi-converter parallel connection system is a problem to be solved.

In order to make the above objectives, features and advantages of the present disclosure more apparent and easier to be understood, the embodiments in the present disclosure are described in detail below in conjunction with the drawings and the embodiments.

Figure 2:
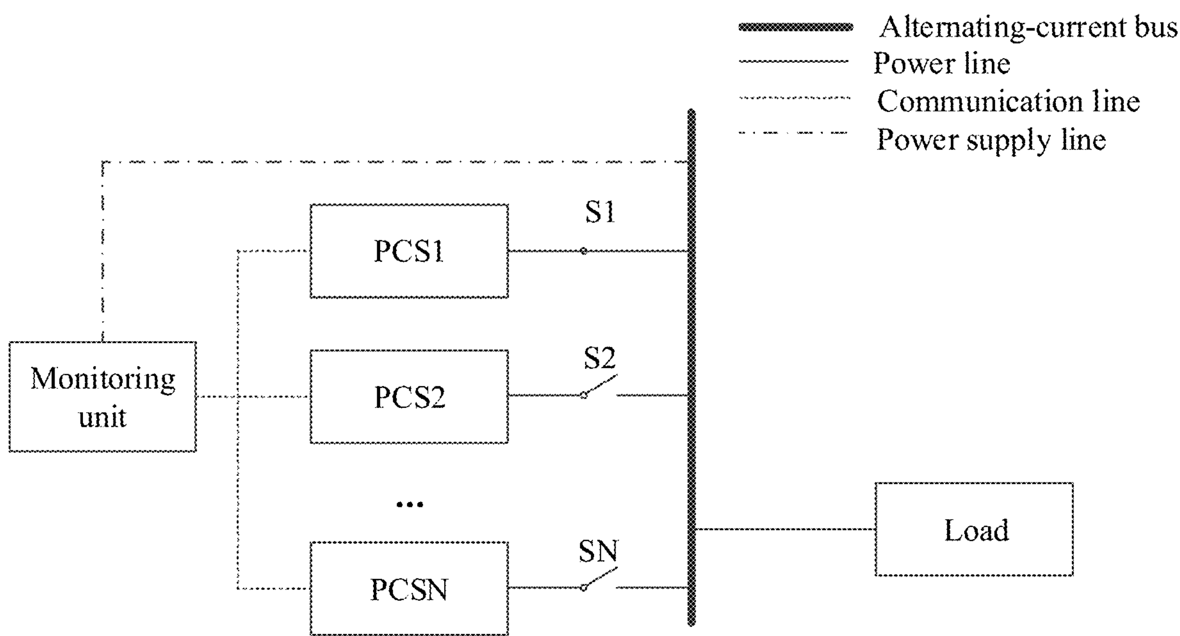
FIG. 2 is a multi-converter parallel connection system according to another embodiment of the present disclosure.

Referring to FIG. 2, FIG. 2 is a schematic diagram of a multi-converter parallel connection system according to another embodiment of the present disclosure.

The multi-converter parallel connection system according to the embodiment of the present disclosure includes N converters. Alternating-current sides of the N converters are connected to an alternating-current bus. N is an integer greater than or equal to 2.

In a case that the N converters are disconnected from a power grid or the power grid fails, M converters among the N converters switch from a current-source operation mode to a voltage-source operation mode to form an alternating-current bus voltage. M is an integer less than or equal to N.

In the embodiments of the present disclosure, M is not limited. For example, M may be one or greater than one. For example, one converter may be started up firstly to operate in the voltage-source operation mode to form an alternating-current bus voltage. In an embodiment, one of the N converters may be configured as a main converter, and the main converter may be started up firstly to form the alternating-current bus voltage.

Since the alternating-current sides of the converters are connected with each other, as long as a converter is started up to operate in the voltage-source operation mode, the alternating-current bus voltage is formed, that is, the alternating-current bus has a voltage. The remaining converters may detect the alternating-current bus voltage, and the alternating-current bus may supply power to the monitoring unit. Then, the monitoring unit may control the converters that have not been started to be started up.

After the alternating-current bus voltage is formed, remaining N-M converters switch from the current-source operation mode to the voltage-source operation mode.

Since the alternating-current sides of all the converters are connected to the alternating-current bus, each of the converters may detect the alternating-current bus voltage and may further control an amplitude and a frequency of the alternating-current bus voltage.

According to the multi-converter parallel connection system in the embodiments of the present disclosure, the multi-converter parallel connection system supplies power to loads in a case that the power grid fails or the alternating-current bus is disconnected from the power grid. In this case, a part of the converters are started up and operate in the voltage-source operation mode to form an alternating-current bus voltage. After the alternating-current bus voltage is formed, the remaining converters are started up and switch from the current-source operation mode to the voltage-source operation mode. Therefore, all the converters switch from the current-source operation mode to the voltage-source operation mode. With the technical solutions according to the present disclosure, it is unnecessary to arrange an auxiliary power supply to power the monitoring unit, and off-grid startup can be performed in the multi-converter parallel connection system, avoiding the cost of the auxiliary power supply.

Several off-grid startup manners according to the embodiments of the present disclosure are described below.

In a first off-grid startup manner, a monitoring unit controls N-M converters to be started up subsequently.

Referring to FIG. 2, the multi-converter parallel connection system according to the embodiment of the present disclosure further includes a monitoring unit. The monitoring unit is connected to the alternating-current bus. The monitoring unit is powered by the alternating-current bus after the alternating-current bus voltage is formed.

The monitoring unit is configured to control the remaining N-M converters to switch from the current-source operation mode to the voltage-source operation mode. For example, PCS1 may be started up firstly. After S1 is turned on, PCS1 switches from the current-source operation mode to the voltage-source operation mode to form an alternating-current bus voltage. After the alternating-current bus voltage is formed, the monitoring unit is powered, operates, and establishes communications with all the converters. The monitoring unit may control PCS2 to PCSN to be started up. The monitoring unit controls PCS2 to PCSN to switch from the current-source operation mode to the voltage-source operation mode. PCS2 to PCSN operate in parallel at the alternating-current bus voltage. After the multi-converter parallel connection system operates stably, the off-grid startup is completed.

In a situation, after an alternating-current bus voltage is formed by M converters operating in the voltage-source operation mode, the remaining N-M converters operating in the current-source operation mode may be automatically connected to the power grid. In this situation, a system failure may occur due to a mismatch between the load and an output power of the multi-converter parallel connection system.

To avoid the above situation, the M converters, operating in the voltage-source operation mode, change an amplitude and/or a frequency of the alternating-current bus voltage. Then, the N-M converters detect that the alternating-current bus fails. It should be understood that the M converters may control the amplitude and the frequency of the alternating-current bus voltage. The M converters may change only the amplitude, only the frequency, or both the amplitude and the frequency. For example, the N-M converters may, on detecting a voltage fault or a frequency fault or both a voltage fault and a frequency fault of the alternating-current bus, stop operating in the current-source operation mode. That is, the N-M converters, operating in the current-source operation mode, cannot to operate normally. After the N-M converters operating in the current-source operation mode switch to the voltage-source operation mode, the M converters regulate the amplitude and/or the frequency of the alternating-current bus voltage to normal values. Thus, the off-grid startup is performed.

It should be understood that in a case that one converter is started up to operate in the voltage-source operation mode, the amplitude and/or the frequency of the alternating-current bus voltage may be changed by the one converter. In a case that multiple converters are started up to operate in the voltage-source operation mode, the amplitude and/or the frequency of the alternating-current bus voltage may be changed by the multiple converters.

In a second off-grid startup manner, at least one of the started converters transmits a predetermined voltage signal to the alternating-current bus, and the remaining N-M converters are automatically started up based on a detected signal.

In the embodiments of the preset disclosure, the predetermined voltage signal is not limited. The predetermined voltage signal may be a voltage signal with a low frequency or a voltage signal with a high frequency. The low frequency and the high frequency are determined based on a fundamental frequency of the power grid or a fundamental frequency of the multi-converter parallel connection system. After the alternating-current bus voltage is formed, at least one converter of the M converters transmits a predetermined voltage signal to the alternating-current bus. The remaining N-M converters, when detecting the predetermined voltage signal, switch from the current-source operation mode to the voltage-source operation mode.

Hereinafter, descriptions are provided by taking the at least one converter of the M converters transmitting a low-frequency voltage signal to the alternating-current bus as an example.

The at least one converter of the M converters transmits a predetermined voltage signal, with an amplitude varying according to a predetermined rule and/or a frequency varying according to a predetermined rule, to the alternating-current bus. The frequency of the predetermined voltage signal is less than or equal to a fundamental frequency of the multi-converter parallel connection system.

The predetermined voltage signal may be a signal with a varying amplitude, such as a signal with a gradually increasing voltage amplitude or a gradually decreasing voltage amplitude, and with a constant frequency. Alternatively, the predetermined voltage signal may be a signal with a constant amplitude and a varying frequency, such as a gradually increasing voltage frequency or a gradually decreasing voltage frequency. Alternatively, the predetermined voltage signal may be a signal with an amplitude varying according to a predetermined rule and a frequency varying according to a predetermined rule. For example, the amplitude of the predetermined voltage signal increases linearly or decreases linearly.

The N-M inverters in the multi-converter parallel connection system sample the alternating-current bus voltage to obtain the amplitude and the frequency of the alternating-current bus voltage. On detecting disturbances of the amplitude varying according to the predetermined rule and/or the frequency varying according to the predetermined rule of the alternating-current bus voltage, the N-M inverters may switch to the voltage-source operation mode. After the N-M inverters switch to the voltage-source operation mode, the M inverters stop applying disturbances to the amplitude and/or the frequency of the alternating-current bus voltage. The N-M inverters operate in parallel at the alternating-current bus voltage. After the multi-converter parallel connection system operates stably, the off-grid startup is completed.

Hereinafter, descriptions are provided by taking the M converters transmitting a high-frequency voltage signal as an example.

In the multi-converter parallel connection system according to the embodiment of the present disclosure, the at least one converter of the M converters transmits a predetermined voltage signal, with an amplitude varying according to a predetermined rule and/or a frequency varying according to a predetermined rule, to the alternating-current bus. The frequency of the predetermined voltage signal is greater than a fundamental frequency of the multi-converter parallel connection system and less than a cut-off frequency of a filter at alternating-current sides of the converters. It should be understood that the amplitude of the predetermined voltage signal varies according to a predetermined rule, or the frequency of the predetermined voltage signal varies according to a predetermined rule, or both the amplitude and the frequency of the predetermined voltage signal vary according to corresponding predetermined rules, which are not limited herein. However, the varied frequency should be greater than a fundamental frequency of the multi-converter parallel connection system and less than a cut-off frequency of a filter at alternating-current sides of the converters. The alternating-current voltage signal is a signal with a voltage varying with a phase in a cycle, and the amplitude varying according to the rule indicates that maximum voltages of the alternating-current voltage signal in different cycles may be different and may vary according to a predetermined rule.

In a case that the M converters transmit a high-frequency voltage signal, the high-frequency voltage signal may be a sinusoidal signal, or may be not a sinusoidal signal, or may be a signal with a constant frequency and a varying amplitude.

After detecting and obtaining the predetermined voltage signal, the N-M converters switch to the voltage-source operation mode. The predetermined voltage signal is an alternating-current voltage signal with a predetermined frequency and a predetermined amplitude.

To avoid misjudgment and misoperation caused by insufficient accuracy of the N-M inverters in obtaining the predetermined voltage signal from the alternating-current bus, the frequency of the predetermined voltage signal should avoid frequencies near the fundamental wave of the multi-converter parallel connection system. Further, the frequency of the predetermined voltage signal should be less than a cut-off frequency of a filter at the alternating-current sides of the converters, preventing excessive attenuation of the signal in passing through the filter. In addition, harmonic frequencies generated by loads should be avoided. Thus, the predetermined voltage signal is an alternating-current voltage signal with a predetermined frequency and a predetermined amplitude, and the predetermined frequency is greater than the fundamental frequency of the multi-converter parallel connection system. In determining the amplitude of the predetermined voltage signal U0, a total harmonic distortion (THD) of the multi-converter parallel connection system is considered. Generally, for the multi-converter parallel connection system, the THD should not exceed 5%, and the proportion of the single harmonic should not exceed 3%.

After the N-M inverters switch the operation mode, the N-M inverters stop transmitting the predetermined voltage signal into the alternating-current bus. After switching to the voltage-source operation mode, the N-M inverters operate in parallel at the alternating-current bus voltage. After the multi-converter parallel connection system operates stably, the off-grid startup is completed.

The multi-converter parallel connection system according to the embodiments of the present disclosure, in a case of a power grid failure or disconnection from the power grid, operate in the off-grid operation state without arranging an auxiliary power supply for the monitoring unit, and the converters switch from the current-source operation mode to the voltage-source operation mode, so that the off-grid startup is performed to continuously supply power to the load. With the technical solutions according to the present disclosure, it is unnecessary to arrange the auxiliary power supply, thereby reducing the cost of the multi-converter parallel connection system.

Based on the multi-converter parallel connection system according to the above embodiments, a voltage regulation method for a multi-converter parallel connection system is further provided according to an embodiment of the present disclosure. Hereinafter, descriptions are provided in detail with reference to the accompanying drawings.

Referring to FIG. 3, FIG. 3 is a flowchart of voltage regulation method for a multi-converter parallel connection system according to an embodiment of the present disclosure.

According to an embodiment of the present disclosure, a voltage regulation method for a multi-converter parallel connection system is further provided. The multi-converter parallel connection system includes N converters. Alternating-current sides of the N converters are connected to an alternating-current bus. N is an integer greater than or equal to 2. The method includes the following steps S301 and S302.

In step S301, M converters among the N converters are switched from a current-source operation mode to a voltage-source operation mode to form an alternating-current bus voltage, when the N converters are disconnected from a power grid or the power grid fails. M is an integer less than or equal to N.

In the embodiments of the present disclosure, M is not limited. For example, M may be one or greater than one. For example, one converter may be started up firstly to operate in the voltage-source operation mode to form an alternating-current bus voltage. In an embodiment, one of the N converters may be configured as a main converter, and the main converter may be started up firstly to form the alternating-current bus voltage.

In step S302, remaining N-M converters among the N converters are switched from the current-source operation mode to the voltage-source operation mode after the alternating-current bus voltage is formed.

Since the alternating-current sides of all the converters are connected to the alternating-current bus, each of the converters may detect the alternating-current bus voltage and may further control an amplitude and a frequency of the alternating-current bus voltage.

According to the voltage regulation method for a multi-converter parallel connection system in the embodiments of the present disclosure, the multi-converter parallel connection system supplies power to loads in a case that the power grid fails or the alternating-current bus is disconnected from the power grid. In this case, a part of the converters are started up and operate in the voltage-source operation mode to form an alternating-current bus voltage. After the alternating-current bus voltage is formed, the remaining converters are started up and switch from the current-source operation mode to the voltage-source operation mode. Therefore, all the converters switch from the current-source operation mode to the voltage-source operation mode. With the technical solutions according to the present disclosure, it is unnecessary to arrange an auxiliary power supply to power the monitoring unit, and off-grid startup can be performed in the multi-converter parallel connection system, avoiding the cost of the auxiliary power supply.

The multi-converter parallel connection system further includes a monitoring unit connected to the alternating-current bus. After the alternating-current bus voltage is formed, the monitoring unit controls the remaining N-M converters to switch from the current-source operation mode to the voltage-source operation mode.

In an embodiment of the present disclosure, the method further includes: changing, by the M converters operating in the voltage-source operation mode, an amplitude and/or a frequency of the alternating-current bus voltage. Thus, the N-M converters stop operating in the current-source operation mode when detecting that the alternating-current bus fails.

The switching remaining N-M converters among the N converters from the current-source operation mode to the voltage-source operation mode after the alternating-current bus voltage is formed may include: transmitting, by at least one converter of the M converters, a predetermined voltage signal to the alternating-current bus after the alternating-current bus voltage is formed; and switching the remaining N-M converters from the current-source operation mode to the voltage-source operation mode when detecting the predetermined voltage signal.

The started converters transmit a predetermined voltage signal to the alternating-current bus, and the remaining N-M converters are automatically started up based on a detected signal.

In the embodiments of the preset disclosure, the predetermined voltage signal is not limited. The predetermined voltage signal may be a voltage signal with a low frequency or a voltage signal with a high frequency. The low frequency and the high frequency are determined based on a fundamental frequency of the power grid or a fundamental frequency of the multi-converter parallel connection system. After the alternating-current bus voltage is formed, at least one converter of the M converters transmits a predetermined voltage signal to the alternating-current bus. The remaining N-M converters, when detecting the predetermined voltage signal, switch from the current-source operation mode to the voltage-source operation mode.

The transmitting, by at least one converter of the M converters, a predetermined voltage signal to the alternating-current bus includes: transmitting, by the at least one converter of the M converters, a predetermined voltage signal with an amplitude varying according to a predetermined rule and/or a frequency varying according to a predetermined rule to the alternating-current bus. The frequency of the predetermined voltage signal is less than or equal to a fundamental frequency of the multi-converter parallel connection system.

The predetermined voltage signal may be a signal with a varying amplitude, such as a signal with a gradually increasing voltage amplitude or a gradually decreasing voltage amplitude, and with a constant frequency. Alternatively, the predetermined voltage signal may be a signal with a constant amplitude and a varying frequency, such as a gradually increasing voltage frequency or a gradually decreasing voltage frequency. Alternatively, the predetermined voltage signal may be a signal with an amplitude varying according to a predetermined rule and a frequency varying according to a predetermined rule.

The transmitting, by at least one converter of the M converters, a predetermined voltage signal to the alternating-current bus includes: transmitting, by the at least one converter of the M converters, a predetermined voltage signal with an amplitude varying according to a predetermined rule and/or a frequency varying according to a predetermined rule to the alternating-current bus. The frequency of the predetermined voltage signal is greater than a fundamental frequency of the multi-converter parallel connection system and less than a cut-off frequency of a filter at alternating-current sides of the converters.

In a case that the M converters transmit a high-frequency voltage signal, the high-frequency voltage signal may be a sinusoidal signal, or may be not a sinusoidal signal, or may be a signal with a constant frequency and a varying amplitude.

After the N-M inverters switch the operation mode, the N-M inverters stop transmitting the predetermined voltage signal into the alternating-current bus. After switching to the voltage-source operation mode, the N-M inverters operate in parallel at the alternating-current bus voltage. After the multi-converter parallel connection system operates stably, the off-grid startup is completed.

It can be seen that the present disclosure has the following beneficial effects.

According to the multi-converter parallel connection system in the embodiments of the present disclosure, the multi-converter parallel connection system supplies power to loads in a case that the power grid fails or the alternating-current bus is disconnected from the power grid. In this case, a part of the converters are started up and operate in the voltage-source operation mode to form an alternating-current bus voltage. After the alternating-current bus voltage is formed, the remaining converters are started up and switch from the current-source operation mode to the voltage-source operation mode. Therefore, all the converters switch from the current-source operation mode to the voltage-source operation mode. With the technical solutions according to the present disclosure, it is unnecessary to arrange an auxiliary power supply to power the monitoring unit, and off-grid startup can be performed in the multi-converter parallel connection system, avoiding the cost of the auxiliary power supply.

It should be noted that the embodiments in the present disclosure are described in a progressive manner, and each of the embodiments focuses on its differences from the other embodiments. The same and similar parts among the embodiments may be referred to each other. Since the product disclosed in the embodiments corresponds to the method disclosed in the embodiments, the description of the method is relatively simple, and references may be made to the description of the product for relevant matters.

The disclosed embodiments are described above so that those skilled in the art can make or use the present disclosure. It is obvious for those skilled in the art to make many modifications to these embodiments. The general principle defined herein may be applied to other embodiments without departing from the spirit or scope of the present disclosure. Therefore, the present disclosure is not limited to the embodiments illustrated herein, but should be defined by the widest scope consistent with the principle and novel features disclosed herein.

The invention claimed is:

1. A multi-converter parallel connection system, comprising N converters, wherein alternating-current sides of the N converters are connected to an alternating-current bus, wherein N is an integer greater than or equal to 2;

M converters among the N converters are configured, when the N converters are disconnected from a power grid or the power grid fails, to switch from a current-source operation mode to a voltage-source operation mode to form an alternating-current bus voltage, wherein M is an integer less than or equal to N; and remaining N-M converters among the N converters are configured, after the alternating-current bus voltage is formed, to switch from the current-source operation mode to the voltage-source operation mode.

2. The system according to claim 1, further comprising a monitoring unit, wherein the monitoring unit is connected to the alternating-current bus;

the monitoring unit is powered by the alternating-current bus after the alternating-current bus voltage is formed; and the monitoring unit is configured to control the remaining N-M converters to switch from the current-source operation mode to the voltage-source operation mode.

3. The system according to claim 1, wherein the M converters, operating in the voltage-source operation mode, are configured to change an amplitude and/or a frequency of the alternating-current bus voltage, wherein the N-M converters, when detecting that the alternating-current bus fails, stop operating in the current-source operation mode.

4. The system according to claim 1, wherein at least one converter of the M converters is configured, after the alternating-current bus voltage is formed, to transmit a predetermined voltage signal to the alternating-current bus; and the remaining N-M converters are configured, when detecting the predetermined voltage signal, to switch from the current-source operation mode to the voltage-source operation mode.

5. The system according to claim 4, wherein the at least one converter of the M converters is configured to transmit a predetermined voltage signal, with an amplitude varying according to a predetermined rule and/or a frequency varying according to a predetermined rule, to the alternating-current bus, wherein the frequency of the predetermined voltage signal is less than or equal to a fundamental frequency of the multi-converter parallel connection system.

6. The system according to claim 4, wherein the at least one converter of the M converters is configured to transmit a predetermined voltage signal, with an amplitude varying according to a predetermined rule and/or a frequency varying according to a predetermined rule, to the alternating-current bus, wherein the frequency of the predetermined voltage signal is greater than a fundamental frequency of the multi-converter parallel connection system and less than a cut-off frequency of a filter at alternating-current sides of the converters.

7. A voltage regulation method for a multi-converter parallel connection system, comprising:

switching M converters, among N converters comprised in the multi-converter parallel connection system, from a current-source operation mode to a voltage-source operation mode to form an alternating-current bus voltage when the N converters are disconnected from a power grid or the power grid fails, wherein alternating-current sides of the N converters are connected to an alternating-current bus, N is an integer greater than or equal to 2, and M is an integer less than or equal to N; and switching remaining N-M converters among the N converters from the current-source operation mode to the voltage-source operation mode after the alternating-current bus voltage is formed.

8. The method according to claim 7, comprising:

controlling, by a monitoring unit comprised in the multi-converter parallel connection system and connected to the alternating-current bus, the remaining N-M converters to switch from the current-source operation mode to the voltage-source operation mode after the alternating-current bus voltage is formed.

9. The method according to claim 7, further comprising:

changing, by the M converters operating in the voltage-source operation mode, an amplitude and/or a frequency of the alternating-current bus voltage, wherein the N-M converters stop operating in the current-source operation mode when detecting that the alternating-current bus fails.

10. The method according to claim 7, wherein the switching remaining N-M converters among the N converters from the current-source operation mode to the voltage-source operation mode after the alternating-current bus voltage is formed comprises:

transmitting, by at least one converter of the M converters, a predetermined voltage signal to the alternating-current bus after the alternating-current bus voltage is formed; and switching the remaining N-M converters from the current-source operation mode to the voltage-source operation mode when detecting the predetermined voltage signal.

11. The method according to claim 10, wherein the transmitting, by at least one converter of the M converters, a predetermined voltage signal to the alternating-current bus comprises:

transmitting, by the at least one converter of the M converters, a predetermined voltage signal with an amplitude varying according to a predetermined rule and/or a frequency varying according to a predetermined rule to the alternating-current bus, wherein the frequency of the predetermined voltage signal is less than or equal to a fundamental frequency of the multi-converter parallel connection system.

12. The method according to claim 10, wherein the transmitting, by at least one converter of the M converters, a predetermined voltage signal to the alternating-current bus comprises:

transmitting, by the at least one converter of the M converters, a predetermined voltage signal with an amplitude varying according to a predetermined rule and/or a frequency varying according to a predetermined rule to the alternating-current bus, wherein the frequency of the predetermined voltage signal is greater than a fundamental frequency of the multi-converter parallel connection system and less than a cut-off frequency of a filter at alternating-current sides of the converters.

13. The system according to claim 2, wherein the M converters, operating in the voltage-source operation mode, are configured to change an amplitude and/or a frequency of the alternating-current bus voltage, wherein the N-M converters, when detecting that the alternating-current bus fails, stop operating in the current-source operation mode.

14. The method according to claim 8, further comprising:

changing, by the M converters operating in the voltage-source operation mode, an amplitude and/or a frequency of the alternating-current bus voltage, wherein the N-M converters stop operating in the current-source operation mode when detecting that the alternating-current bus fails.

* * * * *